May 11, 1971 G. LABROT 3,578,430
SEALED FLOAT GLASS PLANTS
Filed March 27, 1968 3 Sheets-Sheet 3

INVENTOR
GÜNTER LABROT

ATTORNEYS

United States Patent Office 3,578,430
Patented May 11, 1971

3,578,430
SEALED FLOAT GLASS PLANTS
Günter Labrot, Porz, Germany, assignor to Erste Deutsche Floatglas G.m.b.H. & Co. OHG., Porz, Cologne, Germany
Filed Mar. 27, 1968, Ser. No. 716,483
Claims priority, application Germany, Mar. 29, 1967,
E 33,696
Int. Cl. C03b 18/02
U.S. Cl. 65—157                                                 9 Claims

ABSTRACT OF THE DISCLOSURE

The specification describes means for preventing the access of air to molten glass passing from a container or source thereof to a chamber having a bath of molten tin therein, on which the molten glass is floated to produce a glass sheet including a plurality of weirs, at least one of which is of a gas-impervious nature, and a masonry channel having gas-impervious external sheathing structure.

---

Figure 1:
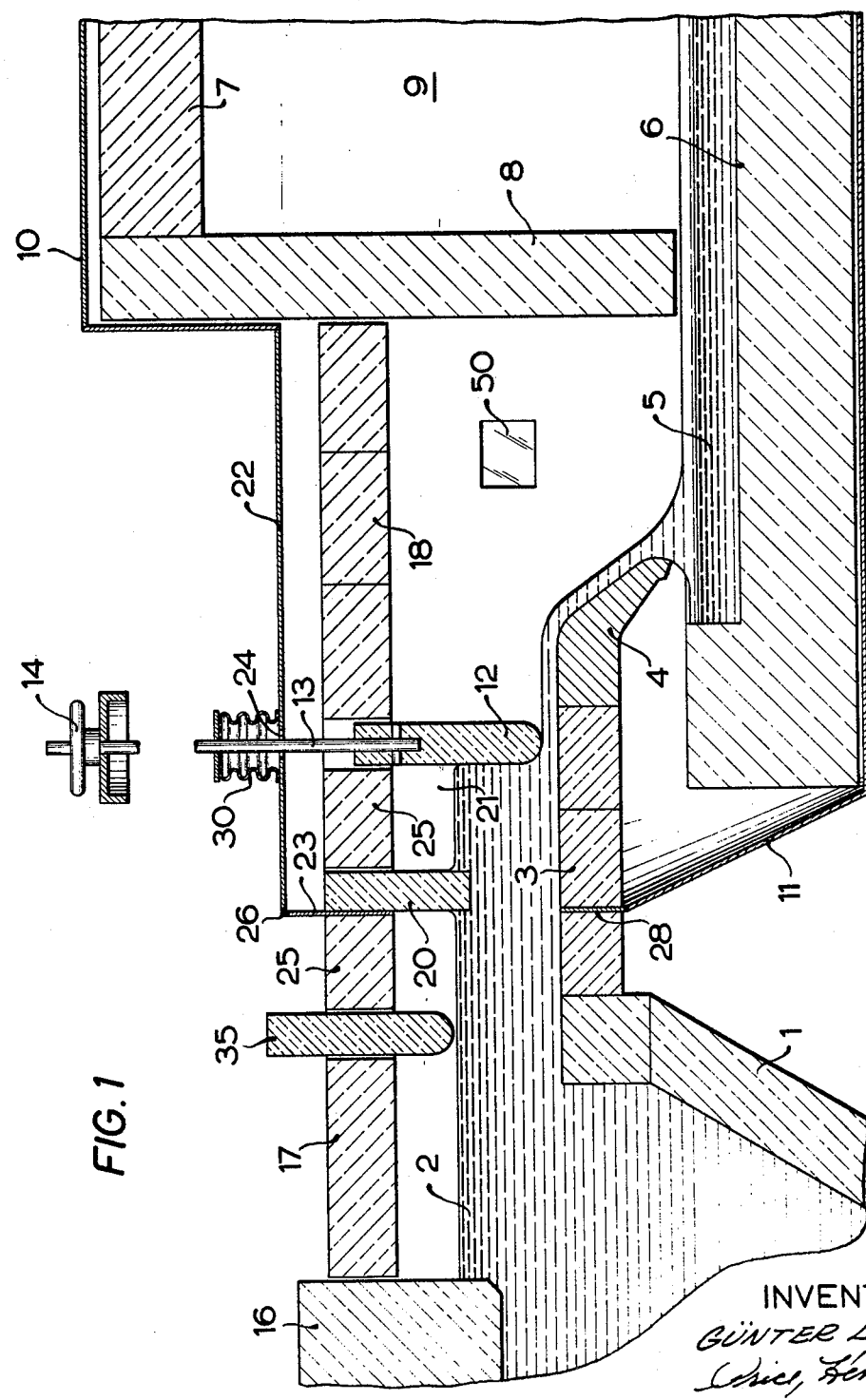

The present invention relates to the production of sheet glass and more particularly though not exclusively to a plant or manufacturing installation for the continuous production of sheet glass with fire-polished surfaces on a bath of molten metal, such as tin, above which a protective gas atmosphere is maintained.

A known form of plant of this type comprises a chamber closed on all sides for the tin bath and with an inlet for the molten glass, an outlet for the solidified glass, a container for molten glass which has an outlet above the level of the glass on the tin bath, a vertically adjustable sliding weir for regulating the thickness of a glass layer passing from the container to the chamber, and means forming a refractory channel or passage which encloses the glass passing from the container to the chamber.

In such a plant, means must be provided to prevent the outside atmosphere from gaining access to the interior of the molten metal chamber, since this causes oxidation of the tin and consequent impairment of the quality of the glass sheet produced.

Significant problems have in the past been encountered in the sealing of the glass inlet opening into the tin bath chamber. In the passage leading from the glass container to the tin chamber in which the glass is floated, extremely high temperatures are present. These create a severe problem as regards the provision of such a sealing means. Since it is necessary to accommodate considerable expansion, joints between the bricks or refractory blocks of this passage construction have in the past been filled with refractory mortar from the outside in order to prevent the penetration of oxygen between the bricks.

It has been found, however, that the sealing of the joints between the bricks in this manner raises substantial problems. For example, if the joints appear to be properly sealed at first, the high temperatures present and the poor mechanical properties of refractory masonry soon allow outside air to enter the passage. Thus, masonry must continuously be resealed. Despite this, it is impossible to guarantee that there are no cracks or other openings which, even though the interior pressure is somewhat greater than atmospheric, will nonetheless allow the entrance of oxygen. Also, ceramic material itself is not always sufficiently dense to prevent the diffusion of gas through it, as opposed to leaking through the joints. Any leakage of oxygen into the channel becomes clearly apparent, since it creates faults in the glass produced.

One object of the present invention is to provide a modification of known float glass plants, by which such a degree of sealing of the channel from the outside atmosphere is achieved that the penetration by diffusion or joint leakage can be avoided with certainty.

Another object of the invention is to provide such an oxygen-proof structure which is simple in construction and easy to maintain.

The present invention comprises a float glass plant of the type having a float chamber with a glass inlet in an end wall, with a controlled atmosphere therein isolated from the outside air, and with a glass supply container, wherein a masonry channel is provided in which the glass is arranged to flow downwards to the glass level in the float chamber, wherein a vertically adjustable weir contacts the glass in the channel and a further weir of gas-impervious material is disposed upstream from the first weir to also contact the glass, with both weirs making gas-tight joints with the inside surfaces of the channel so as to prevent gas moving past them above the glass along the channel, the gas in the channel between the downstream weir and the end wall of the chamber being in communication with the gas inside the chamber, and wherein a sheet metal sheathing surrounds the passage from the end wall to the upstream weir. Preferably, the plant further includes sheet metal sheathing surrounding the chamber, with this metal sheathing being connected with the sheet metal sheathing around the channel.

In accordance with a further preferred form of the invention, the plant further comprises a strip of sheet metal fixed in a masonry joint upstream from the upstream weir and connected in a gas-tight manner with the sheathing around the channel.

In accordance with a still further preferred feature of the invention, the plant further comprises at least one gas-impervious sheet placed in a masonry joint in the bottom of the channel to prevent diffusion of gas along the bottom of the channel, the gas-impervious sheet being connected in a gas-tight manner with the sheathing surrounding the channel. The gas-impervious sheet can be a metal plate.

In accordance with a particular form of the invention, the plant comprises vertical rod means carrying the downstream weir, means for moving the rod means up and down for adjustment of the position of the weir, and sealing means surrounding the rod means.

The plant can also include an inspection window for viewing the interior of the channel, and sealing means holding the window in the sheet metal sheathing surrounding the channel.

Furthermore, in accordance with another feature of the invention, the plant can be arranged so that vertical parts of the sheet metal sheathing around the channel are connected with a piece of sheet metal running underneath the chamber.

The roof part of the channel can be made of self-supporting blocks or bricks, for instance cast bricks of high strength. The use of such bricks substantially simplifies the construction and decreases the height of the channel.

The nature of the invention will be made clear in the following description of specific embodiments of it, shown in the accompanying drawings.

Figure 2:
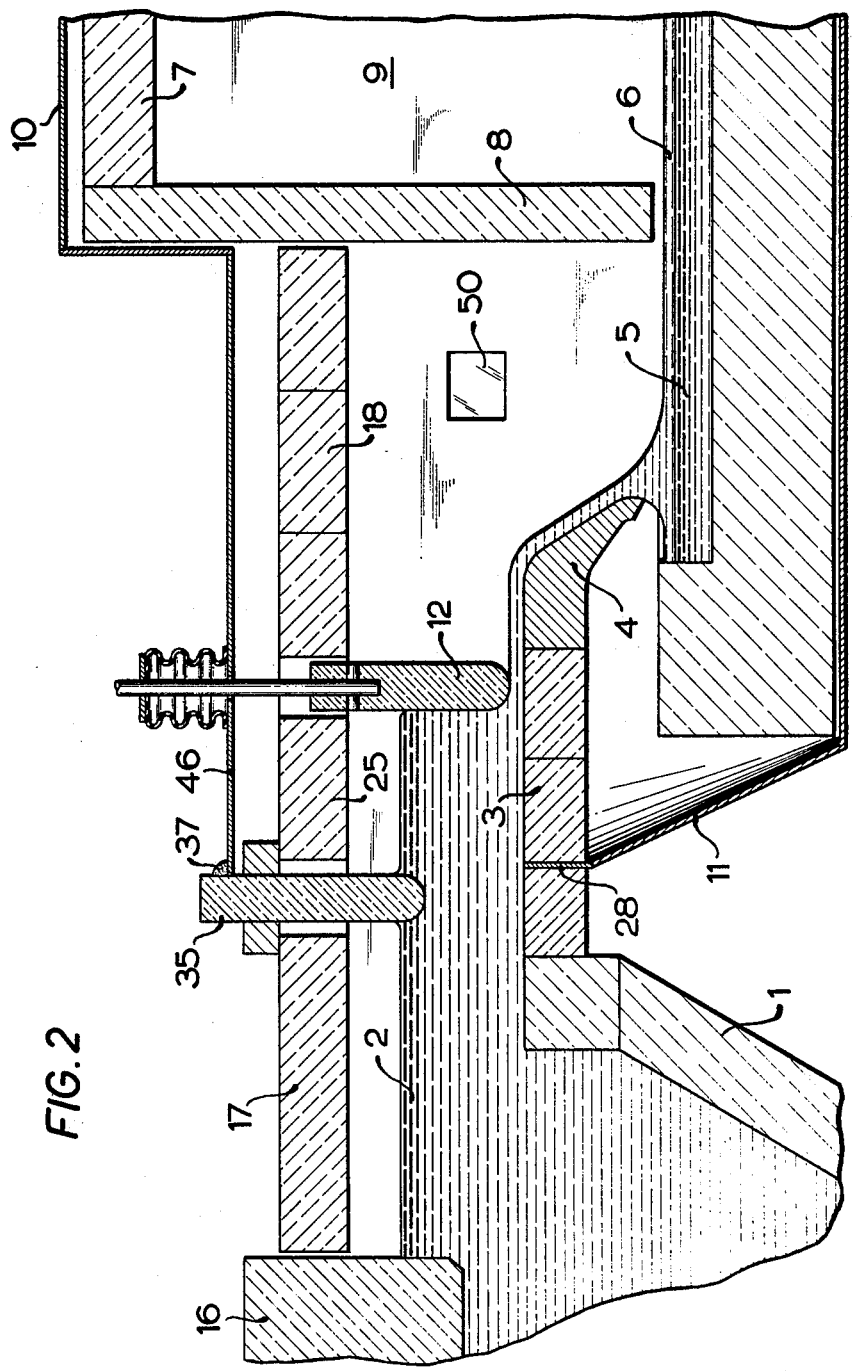
Figure 3:
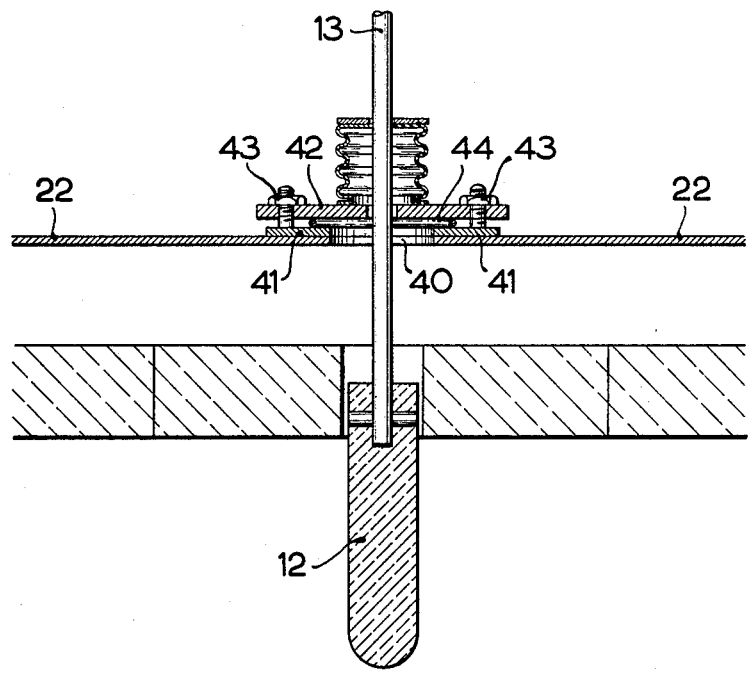

In the drawings:
FIG. 1 shows a first embodiment of the invention in vertical section;
FIG. 2 is a view similar to FIG. 1, illustrating a further embodiment of the invention; and
FIG. 3 is a fragmentary sectional elevation showing a sealing means for use above the control weir.

Referring now to the drawings and more particularly to FIG. 1, the float glass plant includes a container 1 in which the glass is melted. The glass flows through a channel having a bottom 3 and lip 4 down to the level of a tin bath 5, which is located within and extends outwardly somewhat from a chamber 9 made of refractory material. Above the tin bath 5 a protective gas atmosphere is maintained, and in order to prevent this atmosphere from escaping the chamber is fully closed, that is to say, is provided with a roof 7, side walls (not especially indicated), and end walls, of which one is denoted with reference numeral 8. The side walls of the chamber are hermetically joined to the bottom part of the chamber so that air cannot penetrate into the inside of the chamber.

The molten glass initially flows onto the tin bath 5 at a position to the left of the end wall 8, that is to say, a position at which the tin bath extends outside the chamber 9.

The chamber 9 is surrounded by a metal housing or sheathing having an upper part 10 and a lower part 11, and the bottom part 6 of the chamber defines a dished container for the tin bath.

Control of the rate of flow of glass onto the tin bath is provided by a regulating slide or weir 12, which is preferably made of a refractory ceramic material. This regulating weir is attached to rods 13 which are connected to hand wheels 14, by which the weir 12 may be moved up and down.

Between the roof 16 of the glass container 1 and the end wall 8 of the tin bath chamber, the chamber and the glass melt container are connected by a channel which has a roof construction 17, 18, 25 of self-supporting refractory bricks or blocks. This channel serves to protect the glass flowing from the container 1 to the chamber 9, and also to protect the tin bath 5.

Upstream from the weir 12 there is another weir 20 extending from the roof down into the molten glass 2. Weir 20 conveniently consists of a resilient block or brick which extends across the entire width of the channel and is firmly connected with its side walls. The material of this weir is so dense that it prevents the atmosphere obtaining over the glass melt 2 from penetrating into the space 21 between the two weirs 20 and 12. Since the weir 20 dips into the molten glass 2, the spaces above the molten glass 2 on either side of weir 20 are separated from each other in a gas-tight manner. The part of the channel extending between the weir 20 and the end wall 8 is sealed to the outside by means of sheet metal casing or sheathing 22, 23, to prevent the passage of atmospheric air through the masonry of the passage. The sheathing 22, 23 extends not only above the roof portion 18, but also around the sides of the channel and underneath the bottom of it. At the end wall 8 of chamber 9, this sheathing is connected to the metal housing 10 around chamber 9 by welding or another suitable means making a gas-tight joint.

It is also necessary to provide a gas-tight connection with the weir 20 on the side thereof opposite weir 12. In the embodiment of the invention shown in FIG. 1, this gas-tight joint comprises a sheet metal strip 23 which fits into a joint between the weir 20 and a masonry block 25 of the roof construction. Further, strip 23 is also fitted, in a similar manner, into joints in the masonry sides of the channel, and welded to the sheathing part 22 at their mutual junction 26. In order to avoid diffusion of oxygen through the masonry forming the bottom and walls of the channel, upright metal plates 28 are provided which are below the level of the molten glass 2. These plates are also welded to the sheathing disposed about the exterior of the channel.

The rods 13 carrying the weir 12 are provided with sealing means at the position at which they pass through the upper sheathing 22. Such sealing means can be in the form of silicone rubber bellows elements 30, which allow vertical movement of the rods 13. The bellows 30 are fixed at one end to the rods 13 and at the other end to the sheet metal sheathing 22.

Upstream from the regulating weir 12 there is a reserve or shut-off weir 35, which can be used to cut off the flow of glass when the weir 12 has to be replaced. In the embodiment of the invention shown in FIG. 1, the weir 35 is not required to provide for any hermetic sealing action of the space in the channel between it and the weir 20, above the glass melt 2.

The embodiment of the invention shown in FIG. 1 has the disadvantage of including a total of three weirs, of which reserve weir 35 is only rarely used to cut off the flow of molten glass. In a simpler embodiment of the invention, as shown in FIG. 2, the fixed weir 20 is dispensed with, and the reserve weir 35 is placed further downstream in order to fulfill the function of weir 20 as well. In this further embodiment of the invention, the upper sheathing part 46, corresponding to the sheathing part 22 of FIG. 1, is extended as far as the weir 35. A seal is produced between the sheathing and the weir at this point by means of a sealing composition 37, which can easily be removed when the weir 35 must be lowered.

In order to simplify replacement of the weir 12 in either embodiment of the invention, it is possible to provide, as shown in FIG. 3, a space or gap 40 in the sheet metal sheathing 22 (or 46 in the case of FIG. 2) through which the weir can be drawn out upwards and out of the channel in which it previously operated. Adjacent the gap or slit 40 there is a reinforcement frame 41 which is welded onto the sheathing 22, to serve as a mount for a cover 42 held in place by means of bolts or studs 43. A piece of packing or stuffing 44 is provided between the frame 41 and the cover 42 for sealing purposes. In replacing the weir 12, the bolts 43 are removed, the weir 12 and cover 42 are lifted clear, and the latter parts are then exchanged.

As indicated in FIG. 1, it is possible to provide an inspection window 50 for observation of the glass in the downstream part of the channel. The glass of such window is sealed in a frame, which is welded to the sheathing 22.

In the practice of the present invention, it is possible to use a lip 4 which is made of a material that is not resistant to oxidation in an oxygen-containing atmosphere, for instance carbon. This provides an important advantage, in that the lip 4 can be connected with a source of electrical current and made to act as a resistance heating element so as to influence the temperature of glass flowing over the lip.

The embodiments of the invention in which an exclusive property or privilege is claimed are defined as follows.

1. In a float glass plant, of the type having a float chamber containing a molten bath on which molten glass is floated and a controlled internal atmosphere above said bath substantially closed off from the outside air, and further having means for supplying molten glass to said chamber including a trough-like channel having downwardly-inclined portions communicating with said chamber along which molten glass may flow to enter said chamber, the improvement comprising a vertically adjustable first weir extending downwardly toward the glass in the channel and in contact therewith, a second weir of gas-impervious material located upstream from the first weir and also contacting the glass in said channel, and means defining a gas-impervious lateral wall and ceiling structure forming a closed passage with said channel, said passage extending at least from said second weir to said float chamber, and said means making gas-tight joints with the inside surfaces of the channel and the second weir to prevent the passing of gas between the latter and the surface of the glass flowing along the channel throughout the length of such passage.

2. A plant in accordance with claim 1 wherein said lateral wall and ceiling structure is of masonry construction at least in part and has gas-impervious external sheathing enclosing the masonry.

3. A plant in accordance with claim 2, including gas-impervious sheathing structure surrounding at least portions of said chamber, and means forming a gas-tight connection between said sheathing structure and said external sheathing.

4. A plant in accordance with claim 2, wherein said external sheathing includes an integral flange or edge strip and the latter is fixed in a masonry joint located upstream from said second weir.

5. A plant in accordance with claim 2, wherein said external sheathing encloses the underside of said channel and includes a flange or edge portion anchored in a masonry joint in the bottom of the channel to prevent diffusion of gas along the bottom of the channel.

6. A plant in accordance with claim 4, in which said external sheathing material is a gas-impervious sheet metal.

7. A plant in accordance with claim 1, comprising vertical rod means carrying the downstream weir, means for moving the rod means up and down for adjustment of the position of such weir, and sealing means surrounding the rod means and sealing the same with respect to said external sheathing.

8. A plant in accordance with claim 1, further including a reserve weir located upstream of said second weir, and means mounting said reserve weir for downward movement with respect to the bottom of said channel, including movement through the flow of glass and into contact with such channel bottom, to thereby provide a shut-off component.

9. A plant in accordance with claim 1, including means mounting said second weir for downward movement with respect to the bottom of said channel, including movement through the flow of glass and into contact with such channel bottom, to thereby provide a shut-off component.

References Cited

UNITED STATES PATENTS

| 3,334,983 | 8/1967 | Badger | 65—65 |
| 3,450,516 | 6/1969 | Emhiser | 65—65 |
| 3,473,905 | 10/1969 | Jago | 65—27 |
| 3,479,172 | 11/1969 | McCown | 65—162 |

ARTHUR D. KELLOGG, Primary Examiner

U.S. Cl. X.R.

65—32, 65, 99, 182, 204